United States Patent [19]

Himeno et al.

[11] Patent Number: 5,278,294

[45] Date of Patent: Jan. 11, 1994

[54] MONOAZO DYE HAVING DIAMINOPYRIDINE DERIVATIVES

[75] Inventors: Kiyoshi Himeno, Munakata; Ryouichi Sekioka, Kitakyushu, both of Japan

[73] Assignee: Hoechst Mitsubishi Kasei Co., Ltd., Tokyo, Japan

[21] Appl. No.: 887,934

[22] Filed: May 26, 1992

[30] Foreign Application Priority Data

May 28, 1991 [JP] Japan .................. 3-124012

[51] Int. Cl.$^5$ .................. C09B 29/42; D06P 3/36
[52] U.S. Cl. .................. 534/773; 534/770
[58] Field of Search .................. 534/773

[56] References Cited

U.S. PATENT DOCUMENTS 4,042,578  8/1977  Dehnert et al. .................. 534/773
4,855,412  8/1989  Dehnert et al. .................. 534/773 X
5,196,521  3/1993  Ramanathan et al. .................. 534/773

FOREIGN PATENT DOCUMENTS 0244740  11/1987  European Pat. Off. .
0433693   6/1991  European Pat. Off. .

Primary Examiner—Mary C. Lee
Assistant Examiner—Fiona T. Powers
Attorney, Agent, or Firm—Oblon, Spivak, McClelland, Maier & Neustadt

[57] ABSTRACT

A monoazodye of the following formula (I):

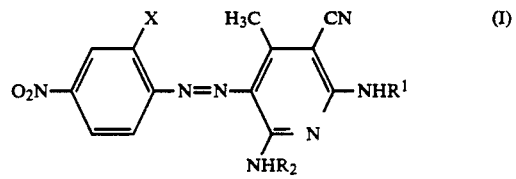

wherein X is CN, Cl or Br, one of $R^1$ and $R^2$ is phenyl and the other is —$C_2H_4OC_2H_4OR^3$, wherein $R^3$ is $C_1$–$C_5$ alkyl, formyl, $C_2$–$C_6$ alkylcarbonyl or $C_2$–$C_6$ alkoxycarbonyl.

2 Claims, No Drawings

MONOAZO DYE HAVING DIAMINOPYRIDINE DERIVATIVES

The present invention relates to a monoazodye. More particularly, it relates to a red disperse dye which is excellent in both the light-fastness and the temperature-dependency and which is capable of dyeing polyester fibers with an excellent red color.

As the material for automobile seats, cloth made of polyester fibers, is commonly used In recent years, the color of seats has been required to be colorful, reflecting the trend for interior fashion of automobiles. However, seats of automobiles are often exposed to direct sunshine under high temperatures in closed compartments, and they are likely to undergo color fading, whereby it is difficult to maintain beautiful colors for a long period of time. Accordingly, as a dye to be used for dyeing polyester fibers for automobile seats, it is advisable to use the one excellent in the light-fastness, the sublimation-fastness and the temperature-dependency.

However, heretofore, there have been a limited number of dyes which are excellent in all of the light-fastness, the sublimation-fastness and the temperature-dependency, and there has been no dye which is fully satisfactory as a red disperse dye for automobile seats.

For example, a disperse dye of the following structural formula (A) is known, as disclosed in U.S. Pat. No. 4,042,578. This dye is excellent in the light-fastness and can be used as a dye for automobile seats, but it is inadequate in the temperature dependency.

The present inventors have conducted various studies with an aim to provide a disperse dye which is excellent in both the light-fastness and the temperature-dependency and which is suitable for dyeing polyester fibers for automobile seats. As a result, they have found that a dye having the same basic structure as the above structural formula (A) and having a certain specific substituent, is excellent in the light-fastness, the sublimation-fastness, the temperature-dependency and the dyeing property.

Thus, the present invention provides a monoazodye of the following formula (I):

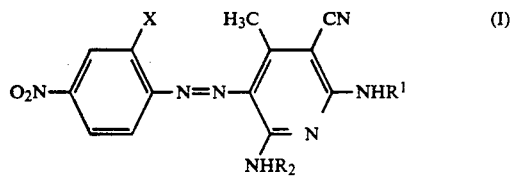

X is CN, Cl or Br, one of $R^1$ and $R^2$ is phenyl and the other is —$C_2H_4OC_2H_4OR^3$, wherein $R^3$ is $C_1$–$C_5$ alkyl, formyl, $C_2$–$C_6$ alkylcarbonyl or $C_2$–$C_6$ alkoxycarbonyl.

Now, the present invention will be described in detail with reference to the preferred embodiments.

In the above formula (I), X is CN, Cl or Br. One of $R^1$ and $R^2$ is phenyl and the other is —$C_2H_4OC_2H_4OR^3$, wherein $R^3$ is $C_1$–$C_5$ alkyl, formyl, $C_2$–$C_6$ alkylcarbonyl or $C_2$–$C_6$ alkoxycarbonyl. The $C_1$–$C_5$ alkyl for $R^3$ may, for example, be straight chain or branched chain $C_1$–$C_5$ alkyl such as methyl, ethyl, n-propyl, i-propyl, n-butyl, sec-butyl or n-pentyl, preferably $C_1$–$C_3$ alkyl.

The $C_2$–$C_6$ alkylcarbonyl may, for example, be alkylcarbonyl having the above-mentioned $C_1$–$C_5$ alkyl, preferably alkylcarbonyl having $C_1$–$C_3$ alkyl. The $C_2$–$C_6$ alkylcarbonyl may, for example, be alkoxycarbonyl having $C_1$–$C_5$ alkoxy, such as methoxycarbonyl, ethoxycarbonyl, n-propoxycarbonyl, i-propoxycarbonyl, n-butoxycarbonyl, sec-butoxycarbonyl or n-pentyloxycarbonyl, preferably alkoxycarbonyl having $C_1$–$C_3$ alkoxy. Among them, a dye wherein $R^3$ is $C_2$–$C_4$ alkylcarbonyl is preferred.

The monoazodye of the above formula (I) of the present invention may, for example, be produced as follows.

Namely, an amine of the following formula (II) is diazotized in accordance with a usual method, followed by coupling with a compound of the following formula (III)

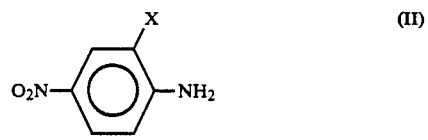

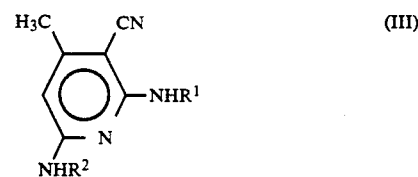

In the formulas (II) and (III), X, $R^1$ and $R^2$ are as defined above.

Fibers capable of being dyed by the monoazodye of the present invention may, for example, be polyester fibers such as polyethylene terephthalate or a polycondensation product of terephthalic acid with 1,4-bis(hydroxymethyl)cyclohexane, or blended yarn products or combined filament yarn products of such polyester fibers with natural fibers such as cotton, silk or wool.

To dye polyester fibers with the monoazodye of the present invention, the dye of the above formula (I) may be dispersed in an aqueous medium to obtain a dyeing bath or a printing paste by using a condensation product of naphthalene sulfonic acid with formaldehyde, a sulfuric acid ester of a higher alcohol or a higher alkylbenzene sulfonate, as a dispersant, in accordance with a usual method, since the dye of the formula (I) is insoluble or hardly soluble in water, and dip dyeing or textile printing may be conducted. For example, in the case of dip dyeing, a common dyeing treatment method such as a high temperature dyeing method, a carrier dyeing method or a thermosol dyeing method, may be employed, whereby polyester fibers or their blended yarn products can be dyed with excellent fastness, and wet-fastness after the post-treatment such as polyurethane treatment, can be maintained at a high level At the time of dyeing, better results can be obtained in some cases by adding an acidic substance such as formic acid, acetic acid, phosphoric acid or ammonium sulfate to the dyeing bath Further, the monoazodye of the formula (I) of the present invention may be used in combination with a dye of the same type or a dye of a different type.

The red dispersed dye of the present invention is excellent particularly in the light-fastness and the temperature-dependency and also has good sublimation-fastness and dyeing property, and it is very useful as a dye for polyester fibers.

Now, the present invention will be described in further detail with reference to Examples. However, it should be understood that the present invention is by no means restricted by such specific Examples.

EXAMPLE 1

0.5 g of a monoazodye of the above formula (I) wherein X is CN, $R^1$ is phenyl and $R^2$ is $-C_2H_4OC_2H_4OCOC_2H_5$, was dispersed in 3 l of water containing 1.0 g of a naphthalene sulfonic acid-formaldehyde condensation product and 2.0 g of a sulfuric acid ester of a higher alcohol, to obtain a dyeing bath. In this dyeing bath, 100 g of polyester cloth was immersed and dyed at 130° C for 60 minutes, followed by soaping, washing with water and drying to obtain polyester cloth dyed with a red color having excellent light-fastness at a level of grade 8 as measured by JIS L 0843 1988 and as evaluated by JIS L 0841-1988 and good sublimation-fastness. Further, the temperature-dependency of this dye was measured and found to be excellent at a level of 70.

The temperature dependency was represented by the relative value of the percentage exhaustion in dyeing at 120° C. relative to the percentage exhaustion at a dyeing temperature of 130° C. in the above dyeing method wherein the percentage exhaustion in dyeing at 130° C. being 100.

The dye used in this Example was prepared as follows.

16.3 g of 2-cyano-4-nitroaniline was dissolved in 33 g of 98% sulfuric acid, and then 33 g of 43% nitrosyl sulfuric acid was added thereto at 5° C., followed by stirring for 2 hours to obtain a diazo solution.

Then, 37 g of a compound of the formula (III) wherein $R^1$ is phenyl and $R^2$ is $-C_2H_4OC_2H_4OCOC_2H_5$, was dissolved in 500 ml of methanol, and then the above diazo solution was dropwise added thereto at a temperature of not higher than 10° C., followed by stirring for 2 hours. Then, the product was separated by filtration and dried to obtain the dye of the present invention. The maximum absorption wavelength ($\lambda_{max}$ in acetone) of this dye was 520 nm.

COMPARATIVE EXAMPLE 1

Polyester cloth was dyed with a dye of the following formula (a monoazodye disclosed in Example 118 in U.S. Pat. No. 4,042,578) in the same manner as in Example 1, whereupon the temperature-dependency was measured and found to be very poor at a level of 40.

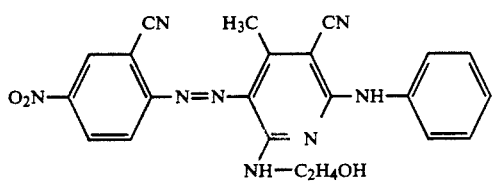

EXAMPLES 2 to 32

With respect to the monoazodyes of the present invention as identified in the following Tables 1 and 2, the temperature-dependency and light-fastness were measured, respectively, in the same manner as in Example 1, and the results are shown in the respective Tables.

TABLE 1

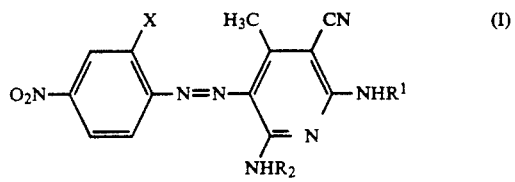

| Example | X | $R^3$ | $\lambda_{max}$ (in acetone) | Temperature-dependency | Light-fastness (grade) |
|---|---|---|---|---|---|
| 2 | CN | $COCH_3$ | 520 | 70 | 8 |
| 3 | CN | $CHO$ | 520 | 65 | 8 |
| 4 | CN | $CH_3$ | 521 | 65 | 8 |
| 5 | CN | $C_2H_5$ | 521 | 65 | 8 |
| 6 | CN | $C_4H_{9(n)}$ | 521 | 60 | 8 |
| 7 | CN | $COOCH_3$ | 520 | 70 | 8 |
| 8 | CN | $COOC_2H_5$ | 520 | 70 | 8 |
| 9 | CN | $COOC_3H_{7(n)}$ | 520 | 70 | 8 |
| 10 | CN | $COOC_3H_{7(n)}$ | 520 | 70 | 8 |
| 11 | Cl | $COC_2H_5$ | 510 | 75 | 8 |
| 12 | Cl | $CH_3$ | 511 | 70 | 8 |
| 13 | Cl | $COCH_3$ | 510 | 75 | 8 |
| 14 | Cl | $COOCH_3$ | 510 | 75 | 8 |
| 15 | Cl | $C_2H_5$ | 511 | 65 | 8 |
| 16 | Br | $COOC_2H_5$ | 512 | 70 | 8 |
| 17 | Br | $COC_2H_5$ | 512 | 70 | 8 |

TABLE 2

$$O_2N-\text{Ar}-N=N-\text{Pyr}-NH-C_2H_4OC_2H_4OR^3$$

| Example | X | $R^3$ | $\lambda_{max}$ (in acetone) | Temperature-dependency | Light-fastness (grade) |
|---|---|---|---|---|---|
| 18 | CN | $COC_2H_5$ | 513 | 70 | 8 |
| 19 | CN | $CH_3$ | 514 | 65 | 8 |
| 20 | CN | $C_2H_5$ | 514 | 65 | 8 |
| 21 | CN | $COCH_3$ | 513 | 70 | 8 |
| 22 | CN | $COC_3H_{7(n)}$ | 513 | 70 | 8 |
| 23 | CN | $COOCH_3$ | 513 | 75 | 8 |
| 24 | CN | $COOC_2H_5$ | 513 | 75 | 8 |
| 25 | CN | $COC_4H_{9(n)}$ | 513 | 70 | 8 |
| 26 | Cl | $COCH_3$ | 503 | 75 | 8 |
| 27 | Cl | $COC_2H_5$ | 503 | 75 | 8 |
| 28 | Cl | $CH_3$ | 504 | 70 | 8 |
| 29 | Cl | $C_2H_5$ | 504 | 70 | 8 |
| 30 | Cl | $COOC_2H_5$ | 503 | 75 | 8 |
| 31 | Br | $COOCH_3$ | 505 | 75 | 8 |
| 32 | Br | $COCH_3$ | 505 | 75 | 8 |

We claim:
1. A monoazo dye of the following formula (I):

wherein X is CN, Cl or Br, one of $R^1$ and $R^2$ is phenyl and the other is $-C_2H_4OC_2H_4OR^3$, wherein $R^3$ is $C_2$-$C_6$ alkylcarbonyl or $C_2$-$C_6$ alkoxycarbonyl.

2. The monoazo dye according to claim 1, wherein $R^3$ is $C_2$-$C_4$ alkylcarbonyl.

* * * * *